US010232556B2

United States Patent
Neufeld et al.

(10) Patent No.: US 10,232,556 B2
(45) Date of Patent: Mar. 19, 2019

(54) METHOD FOR PRODUCING MULTI-LAYERED THERMOPLASTIC PLATES BY MEANS OF THERMAL WELDING OF DIFFERENT PLATES

(71) Applicant: BASF SE, Ludwigshafen (DE)

(72) Inventors: Eckhard Neufeld, Limburgerhof (DE); Carsten Sandner, Bad Dürkheim (DE); Tim Diehlmann, Obrigheim-Colgenstein (DE); Franz-Josef Dietzen, Haßloch (DE); Dietrich Scherzer, Neustadt (DE)

(73) Assignee: BASF SE (Ellwanger & Baier Patentanwälte), Ludwigshafen Am Rhein (DE)

( * ) Notice: Subject to any disclaimer, the term of this patent is extended or adjusted under 35 U.S.C. 154(b) by 66 days.

(21) Appl. No.: 15/538,396

(22) PCT Filed: Dec. 17, 2015

(86) PCT No.: PCT/EP2015/080180
§ 371 (c)(1),
(2) Date: Jun. 21, 2017

(87) PCT Pub. No.: WO2016/102292
PCT Pub. Date: Jun. 30, 2016

(65) Prior Publication Data
US 2017/0368761 A1    Dec. 28, 2017

(30) Foreign Application Priority Data

Dec. 22, 2014    (EP) .................................... 14199632

(51) Int. Cl.
*B29C 65/14* (2006.01)
*B29C 65/10* (2006.01)
(Continued)

(52) U.S. Cl.
CPC ........ *B29C 65/1432* (2013.01); *B29C 65/103* (2013.01); *B29C 65/148* (2013.01);
(Continued)

(58) Field of Classification Search
CPC .................................................. B29C 65/1432
See application file for complete search history.

(56) References Cited

U.S. PATENT DOCUMENTS

| 4,764,328 A | 8/1988 | Matz et al. |
| 2016/0023434 A1 | 1/2016 | Scherzer et al. |
| 2016/0159001 A1 | 6/2016 | Scherzer et al. |

FOREIGN PATENT DOCUMENTS

| DE | 4421016 A1 | 12/1995 |
| DE | 10106341 A1 | 7/2002 |

(Continued)

OTHER PUBLICATIONS

International Search Report for PCT/EP2015/080180 dated Mar. 18, 2016.

(Continued)

*Primary Examiner* — Daniel H Lee
(74) *Attorney, Agent, or Firm* — Drinker Biddle & Reath LLP (57) ABSTRACT

The invention relates to a process for the production of at least two-layer thermoplastic sheets via thermal welding of at least one thinner thermoplastic sheet with density (D1) and of at least one second thinner thermoplastic sheet with density (D2), where the density (D1) of the first thinner thermoplastic sheet is smaller than the density (D2) of the second thinner thermoplastic sheet. The process introduces at least one first heating element and at least one second heating element along mutually offset planes between the two thinner thermoplastic sheets, where the surfaces of the thinner thermoplastic sheets do not touch the surfaces of the (Continued)

heating elements. The first heating element transfers a quantity of energy (E1) to the surface of the first thinner thermoplastic sheet, and the second heating element transfers a quantity of energy (E2) to the surface of the second thinner thermoplastic sheet, where the quantity of energy (E1) is smaller than the quantity of energy (E2).

16 Claims, 3 Drawing Sheets

(51) Int. Cl.
  *B29C 65/72* (2006.01)
  *B29C 65/00* (2006.01)
  *B29C 65/78* (2006.01)
  *B29K 101/12* (2006.01)
  *B29K 105/04* (2006.01)
  *B29K 105/00* (2006.01)
  *B29L 7/00* (2006.01)
  *B29L 9/00* (2006.01)

(52) U.S. Cl.
  CPC ...... *B29C 65/1412* (2013.01); *B29C 65/1467* (2013.01); *B29C 65/72* (2013.01); *B29C 66/1122* (2013.01); *B29C 66/45* (2013.01); *B29C 66/727* (2013.01); *B29C 66/7352* (2013.01); *B29C 66/73132* (2013.01); *B29C 66/73921* (2013.01); *B29C 66/9161* (2013.01); *B29C 66/91423* (2013.01); *B29C 66/91943* (2013.01); *B29C 65/7847* (2013.01); *B29C 66/02241* (2013.01); *B29C 66/71* (2013.01); *B29C 66/73117* (2013.01); *B29C 66/8322* (2013.01); *B29C 66/9192* (2013.01); *B29C 66/929* (2013.01); *B29K 2101/12* (2013.01); *B29K 2105/04* (2013.01); *B29K 2105/256* (2013.01); *B29L 2007/002* (2013.01); *B29L 2009/00* (2013.01)

(56) References Cited

FOREIGN PATENT DOCUMENTS

| | | |
|---|---|---|
| DE | 102012204822 A1 | 8/2012 |
| EP | 0922559 A1 | 6/1999 |
| EP | 1213119 A2 | 6/2002 |
| EP | 1318164 A1 | 6/2003 |
| EP | 2353846 A1 | 8/2011 |
| EP | 2578381 A1 | 4/2013 |
| EP | 2930007 A1 | 10/2015 |
| GB | 2435852 A | 9/2007 |
| JP | 2012232564 A | 11/2012 |
| WO | WO-2009047487 A1 | 4/2009 |
| WO | WO-2012016991 A1 | 2/2012 |
| WO | WO-2016102291 A1 | 6/2016 |

OTHER PUBLICATIONS

Written Opinion of the International Searching Authority for PCT/EP2015/080180 dated Mar. 18, 2016.

METHOD FOR PRODUCING MULTI-LAYERED THERMOPLASTIC PLATES BY MEANS OF THERMAL WELDING OF DIFFERENT PLATES

CROSS-REFERENCE TO RELATED APPLICATIONS

This application is a national stage application (under 35 U.S.C. § 371) of PCT/EP2015/080180, filed Dec. 17, 2015, which claims benefit of European Application No. 14199632.2, filed Dec. 22, 2014, both of which are incorporated herein by reference in their entirety.

The present invention relates to a process for the production of at least two-layer thermoplastic sheets via thermal welding of at least one thinner thermoplastic sheet with density (D1) and of at least one second thinner thermoplastic sheet with density (D2), where the density (D1) of the first thinner thermoplastic sheet is smaller than the density (D2) of the second thinner thermoplastic sheet. The process introduces at least one first heating element and at least one second heating element along mutually offset planes between the two thinner thermoplastic sheets, where the surfaces of the thinner thermoplastic sheets do not touch the surfaces of the heating elements. The first heating element transfers a quantity of energy (E1) to the surface of the first thinner thermoplastic sheet, and the second heating element transfers a quantity of energy (E2) to the surface of the second thinner thermoplastic sheet, where the quantity of energy (E1) is smaller than the quantity of energy (E2).

The number of layers of the at least two-layer thermoplastic sheet per se results from the number of thinner thermoplastic sheets thermally welded to one another. If, by way of example, a first thinner thermoplastic sheet is welded to two second thinner thermoplastic sheets, a three-layer thermoplastic sheet is obtained; if, by way of example, two first thinner thermoplastic sheets are welded to two second thinner thermoplastic sheets, a four-layer thermoplastic sheet is obtained.

EP-A 1 318 164 relates to a process for the production of thick extruded polystyrene foam sheets (XPS sheets) via bonding of two or more thin sheets. The thick sheets are obtained in that the thin sheets are uniformly wetted with an organic solvent for polystyrene at the areas at which they are to be bonded. The foam surface thus becomes solvated, and the sheets can then be pressed on to one another. Examples of suitable solvents are hydrocarbons, alcohols, and ethers with boiling point from 50 to 250° C. In the process of EP-A 1 318 164 it is moreover possible that the foam skins on the main surfaces of the sheets to be bonded to one another are removed before the solvent wets the same. EP-A 1 318 164 does not describe any process that can bond thermoplastic sheets of different density to one another.

EP-A 1 213 119 discloses a process for the bonding of at least two input sheets made of thermoplastic foam to give a new sheet, where the input sheets are free from extrusion skin at the contact areas, and the bonding of the input sheets is achieved via solvent welding. The solvent welding process uses organic solvents with boiling point <150° C., for example acetone, or a mixture of organic solvents with water. Again, EP-A 1 213 119 does not describe bonding of thermoplastic sheets of different density.

DE-A 101 06 341 discloses extruded plastics foam sheets having high thickness. The process described therein for the bonding of at least two input sheets made of plastics foam to give a new sheet can produce sheets with a minimal thickness of 70 mm. These are preferably polystyrene foam sheets free from fluorochlorocarbons. The input sheets, which are free from extrusion skin at the contact area, are bonded to one another in the process with use of an adhesive that permits diffusion, or of mechanical bonding elements. Alternatively, the process can also be carried out with partial-area bonding and localized welding or localized adhesive bonding, with use of adhesive that does not permit diffusion, or an adhesive that permits only a small extent of diffusion. Particularly suitable polystyrene foam sheets are XPS sheets. However, DE-A 101 06 341 contains no information as to how it is specifically possible to carry out the welding of the input sheets, rather than adhesive bonding. DE-A 101 06 341 does not describe bonding of sheets of different density. In a preferred embodiment, the bonding elements also have the same density as the sheets.

DE-A 44 21 016 discloses a process for the production of $CO_2$-foamed plastics sheets of high thickness, in particular made of polystyrene and/or polyethylene, where the corresponding input sheets are doubled via thermal welding. The thermal welding is carried out with the aid of a heating lance, and the surfaces of the plastics foam sheets used are thus melted to some extent. The input sheets to be welded are drawn across the heating lance, thus providing direct contact between the heating lance and input sheets. The heating lance, preferably provided with a Teflon layer, can be brought to the required welding temperature, which is from 100 to 150° C., as required by the plastics foam, electrically or by passage of a hot fluid. There is no description of welding of sheets of different density.

WO 2012/016991 describes thermal insulation materials made of XPS composite materials which have three layers. The three-layer structure of the composite materials is obtained in that a lower, a central, and an upper XPS sheet are combined to give the XPS composite material, where each externally oriented side of said XPS composite material comprises an extrusion skin. While the contact sides of the central XPS sheet likewise have an extrusion skin, this is removed in the case of the appropriate contact sides of the upper, and also lower, XPS sheet. The individual XPS sheets are assembled to give the XPS composite material via thermal welding at the contact areas. The thermal welding process is preferably carried out with use of a heating lance, and also with direct contact between the heating lance and the XPS sheets to be welded, via movement of the XPS sheets across a rigidly arranged heating lance. The weld formed between the individual XPS sheets can have subregions of different intensity, and this means that the corresponding weld is relatively strong at some locations but relatively weak at other locations. There is no description of use of XPS sheets of different density.

EP-A 2 578 381 relates to a process for the production of multilayer plastics sheets, for example XPS, via thermal welding of the corresponding thinner input sheets with use of a two-part heating element. There is no disclosure of different densities of the input sheets. The two-part heating element is of plate design, and the two plate parts are guided from an external location along a plane between the two input sheets to be welded in a manner such that the two plate parts touch one another and in principle represent a single heating plate whose size has been increased (doubled in comparison with the respective plate parts). The thermal welding process is preferably carried out without direct contact between the heating elements and the plastics sheets to be welded. The heating element is kept for a sufficiently long time between the input sheets to be welded. However, EP-A 2 578 381 does not contain any specific time information relating to the expression "sufficiently long time".

Instead, the time is considered sufficient when the respective surfaces of the input sheets are in essence molten.

U.S. Pat. No. 4,764,328 discloses another process for the production of multilayer thermoplastic foams via thermal welding of correspondingly thinner input sheets. Direct contact between heating plate and the surfaces to be welded of the input sheets takes place during the welding procedure in this process, with use of a single heating plate which can optionally also have two parts. Once the surfaces to be welded have been heated, with use of the heating plate, to an extent such that they are liquid, the pressing of the input sheets takes place within a short chronological sequence. The input sheets can be pressed within less than one second after removal of the heating plates. The input sheets have low densities; however, there is no disclosure of different densities of the input sheets in U.S. Pat. No. 4,764,328.

DE-A 10 2012 204 822 relates to a process for the durable bonding of areas of two sheets of two foamed materials. A first and a second sheet are in each case mutually superposed with precise registration in the desired orientation and with the desired extent of overlap by use of a conveying device, and are introduced into a welding unit where they are moved across a separator lance. The positioning of the separator lance between the surfaces facing toward one another of the two sheets produces a gap of defined width. A fixed heating element which is preferably a heating lance and which is present in the gap downstream of the separator lance provides heat to the surfaces facing toward one another of the two sheets via contact-free heat transfer, and at least one of said surfaces is thus softened or is melted to some extent. The two sheets are then assembled by use of elements which apply pressure and which press the two sheets against one another in a manner such that, by virtue of the preceding provision of heat via the heating element, the surfaces facing toward one another of said sheets become coherently bonded to one another. In DE 10 2012 204 822 it is also said that materials of different thickness can be welded to one another, but there is no disclosure of different densities.

JP 2012 232564 discloses a process for welding thermoplastic materials to other thermoplastic materials, wood, or by way of example paper. Here, two heating elements connected to one another are introduced along two mutually parallel planes between the sheets, and the sheets are thus heated. After removal of the heating element, the sheets are bonded to one another by vibration welding. In JP 2012 232564 it is said that the sheets melt only as a result of the frictional heat generated by the vibration, rather than as a result of heating by the heating elements.

EP 2353846 describes a process for the production of insulation sheets made of expanded polystyrene (EPS), where an insulating layer is bonded to an outer layer. By way of example, an EPS sheet comprising dark pigments such as graphite particles is used as insulating layer; a suitable outer layer is an EPS sheet comprising no pigments. The process heats the two sheets via contact with a wedge-shaped oil-heated heating lance, and then presses said sheets together in order to weld same to one another. Again, EP 2353846 does not describe use of sheets of different density.

EP-A 0 922 559 relates to a process for the bonding of components made of molded foams to one another or to other components made of other materials. The process heats the area to be welded of the components by using heated gas and/or a heating element and/or reactive friction, and/or vibration, and/or radiant heaters. The areas to be welded are then pressed against one another. Various thermoplastic materials are described inter alia polypropylene, expanded polypropylene, and also copolymers of these two polymers; thermoplastic polyolefin elastomers are also described. However, nowhere in EP-A 0 922 559 is there any disclosure that the welding process can use two heating elements along two mutually parallel planes.

GB-A 2 435 852 relates to a process for welding the two ends of a sealing ring to one another. Here, a foil is introduced between the two ends of the sealing ring, and the two ends of the sealing ring are heated, as also is the foil. However, GB-A 2 435 852 does not disclose welding of thermoplastic sheets.

The processes described in the prior art for the bonding of two sheets are often not suitable for the welding of two thermoplastic sheets with different density, because the surfaces of the two thermoplastic sheets of different density melt at different rates, and then form non-uniform welds when the two sheets are pressed. There is moreover the risk of complete melting of the lower-density sheet before the surface of the higher-density thermoplastic sheet has been melted to an extent that actually permits welding.

Another problem in thermal welding is the combustibility of the resultant at least two-layer thermoplastic sheets, and also the ability of these to pass fire tests. Even if the thinner sheets to be welded are incombustible or have only very low combustibility, this does not automatically apply to the resultant product, i.e. the two- or multilayer sheets, the thickness of which is greater (than that of the thinner input sheets used). The reason for this different behavior in the event of a fire is found in the weld that is formed during the thermal welding process. The weld forms at the locations where the surfaces of the thinner sheets used are thermally welded to one another. The presence of, and the thickness of, the weld determine whether or not the B2 fire test (in accordance with DIN 4102-1: 1998-05) is passed. As the extent or thickness of the weld increases, flame height increases. This adverse behavior of the two- or multilayer sheets in the event of a fire (in comparison with the thinner input sheets) by virtue of the presence of a weld is also termed "wicking effect". In contrast, if there is no weld present, or only a very thin weld, the bonding between the respective thinner sheets is insufficiently secure, and the corresponding product is therefore unstable.

DETAILED DESCRIPTION OF THE INVENTION

The object underlying the present invention therefore consists in the provision of a novel process for the production of at least two-layer thermoplastic sheets via thermal welding of two thinner thermoplastic sheets of different density.

Said object is achieved via a process for the production of at least two-layer thermoplastic sheets via thermal welding of at least one first thinner thermoplastic sheet with density (D1) and of at least one second thinner thermoplastic sheet with density (D2), where the density (D1) of the first thinner thermoplastic sheet is smaller than the density (D2) of the second thinner thermoplastic sheet, comprising the following steps a) to e):

a) the first thinner thermoplastic sheet and the second thinner thermoplastic sheet are oriented parallel to one another at a distance (a) from one another, thus forming an intervening space, b) at least one first heating element and at least one second heating element are introduced along mutually parallel offset planes into the intervening space in a manner that is parallel to the two thinner thermoplastic sheets, where the surfaces of the thinner thermoplastic sheets and the surfaces of the heating elements do not touch one another and with a distance (a1) between the first heating element and the first thinner thermoplastic sheet and a distance (a2) between the second heating element and the second thinner thermoplastic sheet, c) the heating elements are introduced between the two thinner thermoplastic sheets to an extent such that, in relation to every location on the surface of the first thinner thermoplastic sheet, the first heating element has been present at least temporarily between the two thinner thermoplastic sheets, and to such an extent that, in relation to every location on the surface of the second thinner thermoplastic sheet, the second heating element has been present at least temporarily between the two thinner thermoplastic sheets, where the first heating element transfers a quantity of energy (E1) to the surface of the first thinner thermoplastic sheet and the second heating element transfers a quantity of energy (E2) to the surface of the second thinner thermoplastic sheet, where the quantity of energy (E1) that the first heating element transfers to the surface of the first thinner thermoplastic sheet is smaller than the quantity of energy (E2) that the second heating element transfers to the surface of the second thinner thermoplastic sheet, d) the heating elements are removed entirely from the intervening space, e) at least one of the two thinner thermoplastic sheets is pressed against the surface of the respective other thinner thermoplastic sheet.

A feature of the at least two-layer thermoplastic sheets produced by the process of the invention is that the corresponding number of thinner thermoplastic sheets can be assembled in a very stable manner to give the at least two-layer thermoplastic sheets (product). A feature of the welds which are formed in the process of the invention and which by virtue of the thermal welding process bond the individual thinner thermoplastic sheets to give the at least two-layer thermoplastic sheet is high stability, and also in particular homogeneity. The welds are homogeneous if, across the entire extent of the weld, weld thickness does not change at all or changes only to a small extent.

The process of the invention is in principle what is known as "contactless welding" (or "contactless heating"), because heat transfer from the heating elements to the surface to be welded of the thinner thermoplastic sheets (also termed "input sheets") takes place without direct contact between heating element and input sheet. This has the advantage that in the process of the invention there is no (or only a very small extent of) formation of impressions or depressions on the surfaces of the input sheets to be welded. Said depressions, in particular in the peripheral regions of the input sheets, are a general problem in processes based on direct contact between heating element and surface to be welded. These impressions/depressions lead to increased lack of homogeneity in the weld, and this in turn (as described below) can have an adverse effect on behavior in the event of a fire, and also on the stability of the at least two-layer thermoplastic sheets.

By virtue of the use of at least one first heating element and at least one second heating element which for the purposes of the process of the invention are used along mutually parallel offset planes and without direct contact with the input sheets to be welded, another advantage that should be noted is that the extent to which the surface to be welded of the respective input sheet experiences different heating levels is much smaller than in processes of the prior art. Use of only one heating element, which optionally can also be of two-part design, but where the individual parts are guided along a single plane has the effect, in contrast to the process of the invention, that the individual regions of the respective sheet surface of the input sheets to be welded experience different heating levels, because in particular the peripheral regions of the input sheets on average have direct or indirect exposure to the corresponding heat source for a significantly longer period. This in turn affects the homogeneity of the weld.

Another factor that has to be taken into account in this connection is that when movable heating elements are used the dynamic effects of the introduction and removal of the heating elements between the input sheets to be welded draws cold air into the system behind the heating element, while in contrast warm air in front of the heating element is displaced from the intervening space. The plug flow or turbulent flow thus induced between the sheets to be welded in turn has adverse effects on the homogeneity, and therefore stability, of the weld that is to be formed. By virtue of the inventive use of two movable heating elements along mutually parallel planes, in contrast, air is displaced only to a significantly smaller extent, with no resultant uncontrolled in- and outflow of excessively cold or hot air. In particular when the process of the invention uses two heating elements which are introduced along parallel planes from mutually opposite directions into the intervening space between the input sheets, the problem of plug flow or turbulent flow can be minimized, and the homogeneity of the weld between the input sheets to be welded can be further increased. This effect can be further amplified when the removal of the two heating elements also takes place in respectively opposite directions. It is particularly advantageous here to introduce and remove the individual plates without change of direction, because this permits faster conduct of the process of the invention than a variant with reversal of direction of the two heating elements between the removal step and the introduction step.

Use of at least one first heating element and of at least one second heating element along mutually parallel offset planes and without direct contact with the input sheets to be welded for the purposes of the process of the invention moreover permits introduction of different quantities of energy to the surfaces of the two thinner thermoplastic sheets. This is advantageous because by virtue of the different quantities of energy it is possible to determine precisely in advance the extent of melting of the respective thinner thermoplastic sheet, and thus precisely to predict the thickness of the weld formed between the two input sheets. The average thickness of the resultant weld is preferably from 30 to 500 μm. Energy introduction to the respective surface, and therefore also the thickness of the weld, can in particular be controlled in the invention via the distance between the heating elements and the input sheets to be welded, the temperature of the heating elements, and also the velocity with which the heating elements are introduced into the intervening space between the input sheets, and also removed therefrom. If, by way of example, a three- or multilayer thermoplastic sheet is produced, the (average) thickness of all of the welds formed between the individual pairs of sheets is preferably from 30 to 500 μm, where the corresponding thicknesses between the individual pairs of sheets can also vary. The tensile strength of the at least two-layer thermoplastic sheets per se is moreover high, preferably being greater than 0.15 N/mm².

Another advantage of the process of the invention is considered to be that no limits are required in respect of the thickness of the input sheets. In contrast to this, processes of the prior art, for example as disclosed in DE-A 10 2012 204 822, can only process input sheets with maximal thickness from 80 to 100 mm, because in principle the input sheets are introduced (and moved) in a V-shape and therefore at least one of the input sheets is bent at a sharp angle during the thermal welding process. Because that process uses a heating element that is in principle rigid, in particular a heating lance, the input sheets have to be moved across the heating element. In contrast to that, in the process of the invention the heating element is moved between the input sheets—which in this stage of the process are in principle rigid. In the process of the invention, the input sheets are in principle moved only after removal of the heating elements from the intervening space between the sheets, whereupon the input sheets to be welded are bonded to one another via movement of at least one of the input sheets. The process of the invention can therefore easily produce thermoplastic sheets of any thickness having three or more layers.

Another advantage of the process of the invention is considered to be that it can in principle be carried out with very short conversion times. The expression "conversion time" in the invention means the time that elapses between heating or melting of the surfaces of the sheets and assembly of the heated or molten surfaces of the sheets. In the process of the invention this is therefore the period that begins with the introduction of at least two heating elements in step b) and ends with the assembly of the corresponding input sheets in step e). A short conversion time can in particular be achieved by virtue of the mobility of the heating elements in the context of a contactless welding process.

As already mentioned above, the homogeneity and the thickness of the welds between the input sheets has a positive effect on flame behavior (improved flame retardancy) of the product obtained by the process of the invention. The at least two-layer thermoplastic sheets produced by the process of the invention preferably pass the B2 fire test (in accordance with DIN 4102-1: 1998-05). This means that the wicking effect can be avoided in the context of the present invention, in particular in the B2 fire test, and therefore that the weld in the at least two-layer thermoplastic sheets of the invention withstands the B2 fire test.

Particularly stable coherence of the individual thinner thermoplastic sheets is achieved when these are heated to temperatures above the glass transition temperature or melting point of the thermoplastic used. The individual thinner thermoplastic sheets are preferably then additionally pressed with one another. Another advantageous property of the at least two-layer thermoplastic sheets produced by the process of the invention, in particular those where the surfaces of the sheets are heated to temperatures above the glass transition temperature, is that they have high water-vapor permeability and/or strength after the sheets have been thermally welded to one another.

To the extent that the process of the invention is carried out with use of an absorber of electromagnetic radiation, where the absorber is applied to the appropriate surfaces of the thinner thermoplastic sheets which are thermally welded to one another, another advantage is considered to be that the permeability of the at least two-layer thermoplastic sheets per se to radiation is reduced, and/or that thermal conductivity behavior can be improved. Thermal conductivity can be reduced by up to 10% in comparison with conventional sheets which use no absorber of electromagnetic radiation. Reduction of thermal conductivity implies an insulation effect (in respect of heat).

The process of the invention for the production of an at least two-layer thermoplastic foam sheet is defined in more detail below.

The thermoplastic sheet produced by the process of the invention has at least two layers; it can therefore have precisely two layers, or can have three layers, four layers, five layers, or even more layers. As already stated above, the number of layers of the thermoplastic sheet results per se from the number of the thinner thermoplastic sheets that are thermally welded to one another. The thinner thermoplastic sheets are also termed input sheets. In the case of a two-layer thermoplastic sheet per se, two thinner thermoplastic sheets are therefore thermally welded to one another: a first thinner thermoplastic sheet and a second thinner thermoplastic sheet. In the case of a three- or four-layer thermoplastic sheet per se, three and, respectively, four thinner thermoplastic sheets are therefore thermally welded to one another. It is of no importance here whether two first thinner thermoplastic sheets are first welded to one another and then a second thinner thermoplastic sheet is welded, or whether by way of example a first thinner thermoplastic sheet is welded to a second thinner thermoplastic sheet and then the resultant two-layer thermoplastic sheet is welded, on the side of the second thinner thermoplastic sheet, to another first thinner thermoplastic sheet. If, by way of example, A indicates the first thinner thermoplastic sheet and B indicates the second thinner thermoplastic sheet, the stacking sequence of, for example, a three-layer thermoplastic sheet can be either AAB, or ABA, or BBA, or BAB.

To the extent that the intention is to produce thermoplastic sheets per se with a larger number of layers, for example a ten-layer thermoplastic sheet, it is accordingly necessary that the number of thinner thermoplastic sheets corresponding to the number of layers, for example ten thinner thermoplastic sheets, are welded to one another. It is preferable that the thermoplastic sheet of the invention has two layers, three layers, or four layers; in particular, the thermoplastic sheet of the invention has two layers. The thermal welding process per se (method) is defined in more detail below in the text in connection with the production process of the invention.

The chemical composition of the thinner thermoplastic sheets used for the thermal welding process corresponds per se to that of the at least two-layer thermoplastic sheets produced in the context of the present invention (neglecting the components optionally applied to the surfaces in the context of the welding procedure, the absorbers of electromagnetic radiation, or flame retardants, and neglecting the chemical alterations/reactions occurring at the corresponding surfaces during formation of the weld). The respective thinner thermoplastic sheets to be welded thermally to one another preferably have the same dimensions. In an embodiment, they moreover have the same chemical composition, but different densities. It is optionally also possible that thinner thermoplastic sheets with different dimensions and/or different chemical compositions are thermally welded to one another.

The thinner thermoplastic sheets to be welded thermally to one another have any desired dimensions. Their dimensions in respect of length and width can be in the centimeter range or as much as a number of meters. In respect of their third dimension (thickness), it is theoretically likewise possible to conceive of any desired dimensions. The thickness of the thinner thermoplastic sheets in practice is in the range from 10 to 300 mm.

On the basis of a rectangular coordinate system, in the invention the term "x-direction" applies to the length of an input sheet or of an at least two-layer thermoplastic sheet per se; "y-direction" applies to the corresponding width, and "z-direction" applies to the thickness. The thickness of the at least two-layer thermoplastic sheet increases continuously as the number of welding steps increases.

FIG. 5c shows the case where a three-layer thermoplastic sheet is produced via welding of, for example, a first thinner thermoplastic sheet 8 to a thermoplastic sheet 7 which already has two layers and which in turn per se is an input sheet in relation to the three-layer thermoplastic sheet to be achieved. The two-layer thermoplastic sheet 7 is produced via welding of a first thinner thermoplastic sheet 4 to a second thinner thermoplastic sheet 3 (FIG. 5a and FIG. 5b). The values stated above and below in respect of the thickness of the thinner thermoplastic sheets relate to the corresponding values of an input sheet which per se has not yet undergone any thermal welding step. To the extent that a thermoplastic input sheet having two or more layers is to be used for a further welding step in the sense of FIG. 5c, the thicknesses of the corresponding input sheets having two or more layers are correspondingly higher.

The thickness of the at least two-layer thermoplastic sheets produced in the process of the invention therefore results from the total thickness of all of the thinner thermoplastic sheets (input sheets) used. By virtue of the thermal welding process, the respective surfaces to be welded to one another of the input sheets are melted at least to some extent (melting step); this can lead to a certain reduction of the thickness of the respective input sheets, depending on the quantities of energy (E1) and (E2) transferred. A weld is formed at the locations where the input sheets are thermally welded to one another. In particular when a pressing step and/or melting step is carried out in the context of the production process with transfer of a large quantity of energy (E1) and/or (E2), the thickness of the at least two-layer thermoplastic sheet per se is smaller than the sum of the respective thicknesses of the first thinner thermoplastic sheet used and of the second thinner thermoplastic sheet.

By way of example, the length (x-direction) of the first thinner thermoplastic sheet in step a) is from 500 to 2800 mm, preferably from 1000 to 1500 mm, its width (y-direction) being from 500 to 1250 mm, preferably from 500 to 900 mm, and its thickness (z-direction) being from 20 to 200 mm, preferably from 50 to 100 mm.

By way of example, the length (x-direction) of the second thinner thermoplastic sheet in step a) is from 500 to 2800 mm, preferably from 1000 to 1500 mm, its width (y-direction) being from 500 to 1250 mm, preferably from 500 to 900 mm, and its thickness (z-direction) being from 20 to 200 mm, preferably from 50 to 100 mm.

The thinner thermoplastic sheets per se used for the welding process are known in principle to the person skilled in the art. Suitable thermoplastic sheets are disclosed by way of example in the form of blends in WO 2009/047487. It is possible by way of example to use sheets made of amorphous, crystalline, or semicrystalline thermoplastic foams.

By way of example, the first thinner thermoplastic sheet is a foam sheet based on a polymer selected from the group consisting of polystyrene, polystyrene copolymers, polyether sulfone, polysulfone, polyethylene terephthalate, polyurethane, polyolefins, polyolefin copolymers, and acrylic polymers. Polyolefins are by way of example polyethylene and/or polypropylene. The first thinner thermoplastic sheet is preferably an extruded foam or a molded foam, more preferably an extruded foam based on a polymer selected from the group consisting of polystyrene, polystyrene copolymers, polyether sulfone, polysulfone, thermoplastic polyurethane, and polyethylene terephthalate. The first thinner thermoplastic sheet is most preferably an extruded foam based on a polymer selected from the group consisting of polystyrene, polystyrene copolymers, and polyethylene terephthalate.

The second thinner thermoplastic sheet is by way of example a thermoplastic polymer selected from the group consisting of polystyrene, polystyrene copolymers, polyether sulfone, polysulfone, polyethylene terephthalate, polyurethane, polyolefins, polyolefin copolymers, and acrylic polymers. The second thinner thermoplastic sheet is preferably a foam based on a thermoplastic polymer selected from the group consisting of polystyrene, polystyrene copolymers, polyether sulfone, polysulfone, polyethylene terephthalate, polyurethane, polyolefins, polyolefin copolymers, and acrylic polymers. The second thinner thermoplastic sheet is more preferably an extruded foam or a molded foam, with particular preference an extruded foam based on a polymer selected from the group consisting of polystyrene, polystyrene copolymers, polyether sulfone, polysulfone, thermoplastic polyurethane, and polyethylene terephthalate. The second thinner thermoplastic sheet is most preferably an extruded foam based on a polymer selected from the group consisting of polystyrene, polystyrene copolymers, and polyethylene terephthalate.

Other expressions used for polystyrene copolymers are copolymers produced from styrene and styrene copolymers. The meaning of the expression "polymer based on a polystyrene copolymer" is that production of said copolymer requires at least one other monomer alongside monomeric styrene. It is preferable that this copolymer is produced from styrene and from one other monomer. Suitable comonomers for styrene are in principle any of the monomers polymerizable with styrene. It is preferable that there are at least 50% by weight of styrene polymerized in said copolymer, based on the total weight of the copolymer.

It is preferable that a copolymer produced from styrene has, as comonomer for styrene, a monomer selected from α-methylstyrene, ring-halogenated styrene, ring-alkylated styrenes, acrylonitrile, acrylate, methacrylate, N-vinyl compounds, maleic anhydride, butadiene, divinylbenzene, and butanediol diacrylate. Acrylates, and also methacrylates, are preferably obtainable from alcohols having from one to eight carbon atoms; a suitable N-vinyl compound is by way of example vinylcarbazole; preferred copolymers produced from styrene are styrene-acrylonitrile copolymers (SAN) and acrylonitrile-butadiene-styrene copolymers (ABS).

In the invention the density of the first thinner thermoplastic sheet is (D1), and the density of the second thinner thermoplastic sheet is (D2), where the density (D1) of the first thinner thermoplastic sheet is smaller than the density (D2) of the second thinner thermoplastic sheet. It is clear to the person skilled in the art that the density of the two thinner thermoplastic sheets can be influenced by the production process. By way of example, the density can be influenced by the quantity of blowing agent used during production of the thinner thermoplastic sheets, preferably of the thinner thermoplastic foam sheets. By virtue of the production process, therefore, the density of a first thinner thermoplastic sheet produced from, for example, polystyrene can differ from the density of the second thinner thermoplastic sheet produced by way of example likewise from polystyrene.

The density (D1) of the first thinner thermoplastic sheet is by way of example in the range from 10 to 70 g/l, preferably in the range from 10 to 50 g/l, and with particular preference in the range from 10 to 30 g/l. Methods for determining the density (D1) of the first thinner thermoplastic sheet are known per se to the person skilled in the art; the density is usually determined in accordance with DIN EN 1602, valid as at 2013.

The density (D2) of the second thinner thermoplastic sheet is by way of example in the range from 15 to 100 g/l, preferably in the range from 20 to 100 g/l, and with particular preference in the range from 25 to 75 g/l. Methods for determining the density (D2) of the second thinner thermoplastic sheet are known per se to the person skilled in the art; the density is usually determined in accordance with DIN EN 1602, valid as at 2013.

It will be self-evident that in cases where ranges overlap the corresponding density values have been selected in such a way that the density (D1) of the first thinner thermoplastic sheet is smaller than the density (D2) of the second thinner thermoplastic sheet.

The density (D1) is generally smaller by at least 1 g/l than the density (D2), preferably by at least 2 g/l, and with particular preference by at least 5 g/l.

The density (D1) is usually smaller than the density (D2) by at most 40 g/l, preferably by at most 30 g/l, and with particular preference by at most 20 g/l.

The conduct of the thermal welding process per se is known to the person skilled in the art. In the invention, the thermal welding effect is achieved for the surfaces to be welded in that the respective surfaces of the input sheets are exposed to a heat source. The heat source in the process of the invention is represented by the at least one first heating element and the at least one second heating element which are introduced along offset mutually parallel planes parallel to the two thinner thermoplastic sheets in the intervening space between the two thinner thermoplastic sheets.

The thermalwelding process forms a weld between the surfaces to be welded (of the input sheets). It is also possible to use the terms "weld skin" and "weld zone" instead of the term "weld". In the case of the pair of input sheets to be welded, the thermal welding process forms a weld between those surfaces of the two input sheets that are brought into contact with one another. If, by way of example, a three-layer thermoplastic sheet is produced, three thinner thermoplastic sheets (input sheets) are used, and therefore two welds are formed. It is preferable that the thickness of at least one weld is from 30 to 500 µm; with preference, the thickness of every weld is from 30 to 500 µm. In particular, the thickness of every weld is the same (for example 300 µm). The thickness of the weld formed by the thermal welding process is by way of example from 30 to 500 µm, preferably from 50 to 300 µm, more preferably from 70 to 200 µm, and most preferably from 80 to 150 µm.

The numerical values listed in the context of the present invention for the thickness of a weld are to be interpreted as average values, where each such average value is preferably determined via optical microscopy determinations at 5 measurement points distributed across the entire length of the weld. The abovementioned values in respect of weld thickness in the invention apply across the entire extent of the weld.

The thermoplastic sheets of the invention and the corresponding input sheets can have any desired values in respect of their cell size and/or average cell number. The respective values for the input sheets are also found in the thermoplastic sheets of the invention, i.e. they are not changed by the thermal welding process. However, it is preferable that the cell size of the at least two-layer thermoplastic sheet is smaller than 200 µm, with preference smaller than 100 µm, and/or that the average cell number is greater than 6 cells/mm. Whereas input sheets with average cell size 200 µm or more have relatively high surface roughness and coarse cell structure, input sheets in particular with average cell size <150 µm, preferably <100 µm, have very fine structure and smooth surface; this has a favorable effect on success in fire tests and on thermal insulation performance. The cell sizes of the input sheets are usually in the range from 50 to 200 µm, the cell sizes of the cells of the second thinner thermoplastic sheet being smaller than those of the cells of the first thinner thermoplastic sheet.

In step a) of the process of the invention, the first thinner thermoplastic sheet and the second thinner thermoplastic sheet are oriented parallel to one another at a distance (a) from one another, thus forming an intervening space.

The distance (a) here is selected in a way that permits movement of at least two heating elements in offset mutually parallel planes between the corresponding input sheets in such a way that they do not touch the corresponding input sheets (see also description relating to the subsequent step b)). There is also a certain distance here between the heating elements, in order to ensure smooth introduction and removal of the heating elements. As the number of heating elements introduced into, and removed from, the intervening space along offset mutually parallel planes increases in the process of the invention, the distance (a) also increases.

It is preferable that in step a) the distance (a) between the first thinner thermoplastic sheet and the second thinner thermoplastic sheet is from 10 to 150 mm, preferably from 15 to 80 mm.

Figure 1:
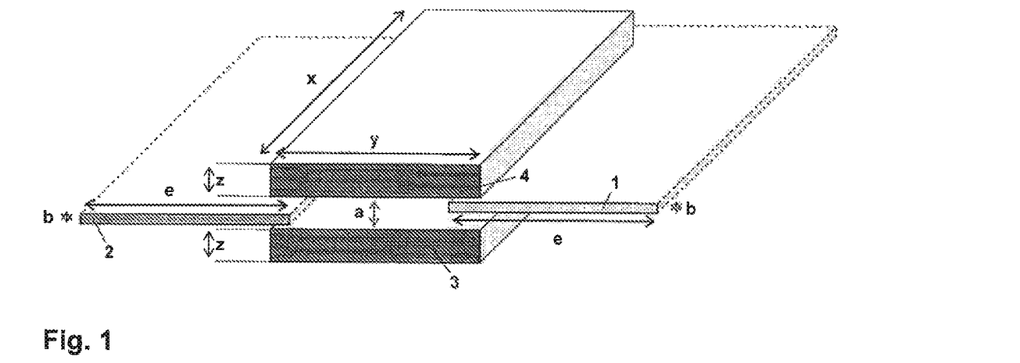
FIG. 1 shows the parallel orientation of the input sheets in step a).

FIG. 1 illustrates the parallel orientation of the input sheets in step a). The first thinner thermoplastic sheet is indicated by reference sign "4", and the second thinner thermoplastic sheet is indicated by reference sign "3". "x" indicates the respective length of the input sheet (preferably from 800 to 2800 mm), and "y" represents the width of the input sheets (preferably from 500 to 1250 mm), and "z" represents the thickness of the input sheets (preferably from 50 to 100 mm). It will be self-evident that the length, width and thickness of the two input sheets can be different. The orientation of the two input sheets 3 and 4 is parallel at a distance (a) from one another that is preferably from 10 to 150 mm.

In step b) of the process of the invention, at least one first heating element and at least one second heating element are introduced along mutually parallel offset planes into the intervening space in a manner that is parallel to the two thinner thermoplastic sheets, where the surfaces of the thinner thermoplastic sheets and the surfaces of the heating elements do not touch one another and with a distance (a1) between the first heating element and the first thinner thermoplastic sheet and a distance (a2) between the second heating element and the second thinner thermoplastic sheet.

It is possible in the invention to use, as heating elements, any of the heating elements that are known to the person skilled in the art, where these are capable of movement and permit contactless welding for the purposes of the present invention. It is preferable in the invention to use precisely one first heating element and precisely one second heating element. Precisely two heating elements are therefore used. It is moreover preferable that the heating elements are heating plates. To the extent that more than two heating elements are used, it is preferable to use an even number of heating elements along offset mutually parallel planes. It is preferable here that the number of first heating elements is equal to the number of second heating elements. Preferred heating elements are heating plates with a surface temperature in the range from 200 to 700° C., in particular in the range from 300 to 500° C., heated indirectly by means of IR sources. It is also possible by way of example that the heating elements are preheated in the external position (inactive position) by IR sources or by means of induction heating. Alternatively, heating via electrical resistance heating or by means of hot fluids is possible.

Figure 2:
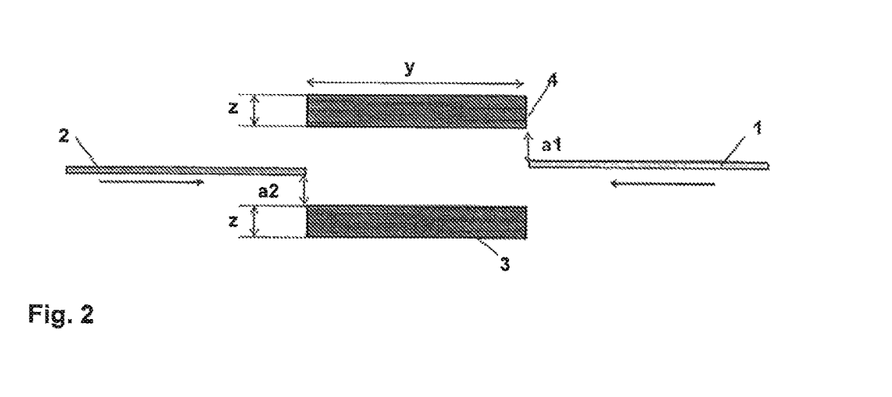
FIG. 2 shows an external position for the first heating element 1 and the second heating element 2.

FIG. 2 depicts such an external position (inactive position or park position) for the first heating element 1 and the second heating element 2. The expression external position therefore means those positions of the heating elements that are located outside of the intervening space defined in the preceding step a) between the two input sheets. As can be seen from FIG. 2, the two heating elements 1 and 2, preferably heating plates, are introduced in the direction of the arrow into said intervening space between the input sheets (see also FIG. 3 and FIG. 1).

It is preferable in the invention to use two identical heating elements, in particular heating plates; it is also optionally possible that the heating elements have different characteristics, in particular different thickness. The dimensions of the heating elements are selected to be appropriate for the corresponding dimensions of the input sheets to be welded. The heating elements can in principle, in respect of their length (x-direction), their width (y-direction), and their thickness (z-direction), respectively be larger and/or smaller than the corresponding dimensions of the input sheets to be welded.

It is preferable that the length (x-direction) of the first heating element is the same as or at most 10% greater than the length (x-direction) of the first thinner thermoplastic sheet, and the width (y-direction) of the first heating element is from 30 to 120%, preferably from 60 to 110%, of the width (y-direction) of the first thinner thermoplastic sheet. The length (x-direction) of the second heating element is the same as or at most 10% greater than the length (x-direction) of the second thinner thermoplastic sheet, and the width (y-direction) of the second heating element is from 30 to 120%, preferably from 60 to 110%, of the width (y-direction) of the second thinner thermoplastic sheet.

The width of a heating element is indicated by e in FIG. 1, and by way of example can be from 50 to 1400 mm. The thickness of a heating element is indicated in FIG. 1; it is preferable that the thickness of both heating plates 1 and 2 is from 5 to 50 mm.

The distance (a1) between the first heating element and the first thinner thermoplastic sheet is usually in the range from 0.5 to 10 mm, preferably in the range from 1.0 to 7.5 mm, more preferably in the range from 1 to 5 mm. The distance (a2) between the second heating element and the second thinner thermoplastic sheet is usually in the range from 0.2 to 7.5 mm, preferably in the range from 0.4 to 5.0 mm, more preferably in the range from 0.4 to 3.0 mm.

The distance (a1) is generally greater by at least 0.2 mm, preferably 0.6 mm, than the distance (a2).

The distance (a1) is generally greater by at most 5 mm, preferably by at most 2 mm, than the distance (a2).

It is be self-evident that the distance (a1) of the first thinner thermoplastic sheet and the first heating element is greater than the distance (a2) between the second thinner thermoplastic sheet and the second heating element.

In step c) of the process of the invention the heating elements are introduced between the two thinner thermoplastic sheets to an extent such that, in relation to every location on the surface of the first thinner thermoplastic sheet, the first heating element has been present at least temporarily between the two thinner thermoplastic sheets, and to such an extent that, in relation to every location on the surface of the second thinner thermoplastic sheets, the second heating element has been present at least temporarily between the two thinner thermoplastic sheets. The first heating element here transfers a quantity of energy (E1) to the surface of the first thinner thermoplastic sheet and the second heating element transfers a quantity of energy (E2) to the surface of the second thinner thermoplastic sheet. The quantity of energy (E1) that the first heating element transfers here to the surface of the first thinner thermoplastic sheet is smaller than the quantity of energy (E2) that the second heating element transfers to the surface of the second thinner thermoplastic sheet.

It is preferable that when the heating elements have been introduced into the intervening space they are kept there for a time in the range from 0.2 to 10 seconds, preferably in the range from 0.5 to 7.5 seconds, and with particular preference in the range from 1.0 to 4.0 seconds.

Figure 3:
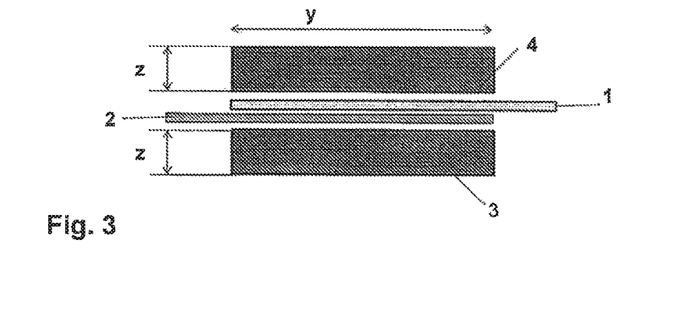
FIG. 3 shows an embodiment of step c).

Step c) is depicted in FIG. 3. As can be seen from FIG. 3, every location (point or region) of the respective surface of the respective input sheet 3 and 4 is adjacent to the respective heating element 1 and 2. In other words, the first heating element 1 is present at every location on the surface of the first thinner thermoplastic sheet 4, and the second heating element 2 is present at every location on the surface of the second thinner thermoplastic sheet 3.

The quantity of energy (E1) transferred to the first thinner thermoplastic sheet by the first heating element is preferably adjusted via the distance (a1) between the first heating element and the first thinner thermoplastic sheet.

The statements and preferences above apply to the distance (a1) between the first heating element and the first thinner thermoplastic sheet.

The quantity of energy (E2) transferred to the second thinner thermoplastic sheet by the second heating element is preferably adjusted via the distance (a2) between the second heating element and the second thinner thermoplastic sheet.

The statements and preferences above apply to the distance (a2) between the second heating element and the second thinner thermoplastic sheet.

It is moreover preferable that the quantity of energy (E1) transferred to the first thinner thermoplastic sheet by the first heating element is adjusted via the temperature (T1) of the first heating element.

It is moreover preferable that the quantity of energy (E2) transferred to the second thinner thermoplastic sheet by the second heating element is adjusted via the temperature (T2) of the second heating element.

The quantity of energy (E1) transferred to the surface of the first thinner thermoplastic sheet melts the surface of the first thermoplastic sheet. The quantity of energy (E2) transferred to the surface of the second thinner thermoplastic sheet melts the surface of the second thinner thermoplastic sheet. The quantities of energy (E1) and (E2) required for melting are proportional to the density, and also to the heat capacity, of the corresponding first thinner thermoplastic sheet and of the second thinner thermoplastic sheet. The following formulae apply:

$$E1 = c_{p1} \cdot \Delta T1 \cdot D1 \cdot A1 \cdot \Delta s1 = c_{p1} \cdot \Delta T1 \cdot D1 \cdot \Delta V1$$

$$E2 = c_{p2} \cdot \Delta T2 \cdot D2 \cdot A2 \cdot \Delta s2 = c_{p2} \cdot \Delta T2 \cdot D2 \cdot \Delta V2$$

$c_{p1}$ and $c_{p2}$ are the heat capacity of the first thinner thermoplastic sheet and of the second thinner thermoplastic sheet. Methods for determining the heat capacity of the respective thinner thermoplastic sheet are known per se to the person skilled in the art; the heat capacity is usually determined in accordance with DIN EN ISO 11357-4: 2014-10.

$\Delta T1$ and $\Delta T2$ are the temperature increases required at the surface of the first thinner thermoplastic sheet and at the surface of the second thinner thermoplastic sheet to permit welding of the sheets.

A1 and A2 are the area of the surface of the first thinner thermoplastic sheet and the area of the surface of the second thinner thermoplastic sheet. They are therefore equal to the length of the respective thinner thermoplastic sheet multiplied by the width of the second thinner thermoplastic sheet.

$\Delta s1$ and $\Delta s2$ are the thickness of the layer of the first thinner thermoplastic sheet and of the second thinner thermoplastic sheet that is to be heated, i.e. that is to be melted.

D1 and D2 are the density of the first thinner thermoplastic sheet and of the second thinner thermoplastic sheet.

The quantity of energy (E1) and (E2) transferred from the first heating element to the surface of the first thinner thermoplastic sheet, and respectively from the second heating element to the second thinner thermoplastic sheet, can be determined via the following formula:

$$E1 = \lambda 1 \cdot A1 \cdot (T1 - T_{01})/a1 \cdot t1$$

$$E2 = \lambda 2 \cdot A2 \cdot (T1 - T_{02})/a2 \cdot t2$$

$\lambda 1$ and $\lambda 2$ are the thermal conductivity of the gas, preferably of the air, in the intervening space between the first heating element and the first thinner thermoplastic sheet and, respectively, between the second heating element and the second thinner thermoplastic sheet. The thermal conductivity can be determined in accordance with DIN EN ISO 22007-1: 2012-04.

T1 and T2 are the temperature of the first heating element and, respectively, of the second heating element.

$T_{01}$ and $T_{02}$ are the temperature of the first thinner thermoplastic sheet and, respectively, of the second thinner thermoplastic sheet.

a1 and a2 are the distance between the first heating element and the first thinner thermoplastic sheet and the distance between the second heating element and the second thinner thermoplastic sheet.

1 and t2 are the time during which the first heating element transfers the quantity of energy (E1) to the first thinner thermoplastic sheet and, respectively, the time during which the second heating element transfers the quantity of energy (E2) to the second thinner thermoplastic sheet. It is preferable that in the process of the invention t1=t2.

Figure 4:
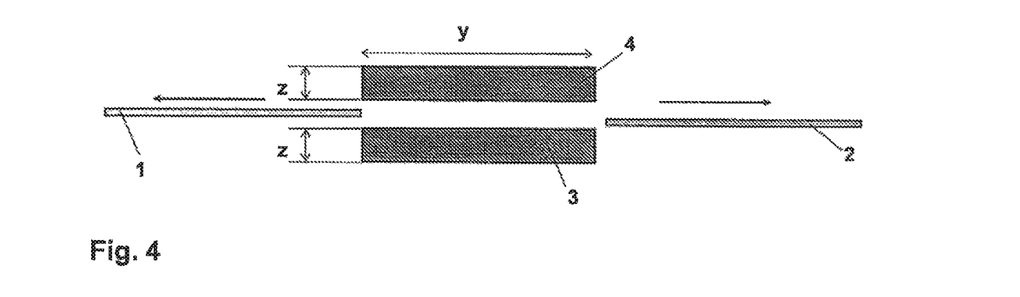
FIG. 4 shows heating elements removed entirely from the intervening space.

In step d) the heating elements are removed entirely from the intervening space. This is depicted in FIG. 4. It is preferable in the invention that the heating elements and the introduction of the heating elements in step b) take place in the same direction. As can be seen from the two-dimensional depiction in FIGS. 2 to 4, the first heating element 1 is passed from right to left through the intervening space between the two input sheets, whereas the second heating element 2 is passed in the precisely opposite direction from left to right.

In step e) at least one of the two thinner thermoplastic sheets is pressed against the surface of the respective other thinner thermoplastic sheet.

This step is explained below for the horizontal arrangement of the thinner thermoplastic sheets. The principles of the description also apply to the vertical orientation of the two thinner thermoplastic sheets. The vertical orientation of the two thinner thermoplastic sheets is preferred.

Figure 5:
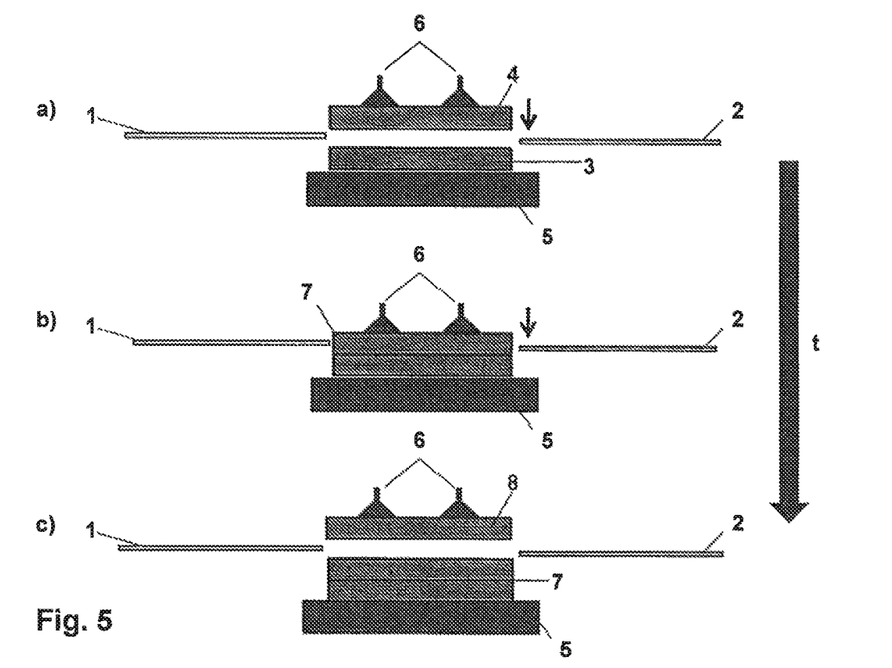
FIGS. 5a and 5b show only one of the two input sheets pressed against the respective other input sheet.
FIG. 5c shows two or more layers being used for a further welding step.

It is possible that only one of the two input sheets is pressed against the respective other input sheet. This is depicted in FIGS. 5a and 5b. If the three-dimensional arrangement of the input sheets is horizontal (as shown in FIGS. 2 to 5) it is preferable that the spatially upper input sheet 4 (first thinner thermoplastic sheet) is pressed against the lower input sheet 3 (second thinner thermoplastic sheet). It is preferable that the two input sheets are pressed against one another in step e), i.e. moved toward one another until the distance (a) is zero.

This is preferably achieved with the use of an appropriate gripper device 6 which can not only retain the input sheets but also, with application of pressure, move these against the other sheets. As depicted in FIG. 5, the input sheets (3 and 7) can be retained on a device 5 which, as shown in FIG. 5c, can be moved appropriately during production of thermoplastic sheets having a larger number of layers. The design of the device 5 is such that it can be used to exert pressure on the input sheet 3 (and 7) in the direction of the input sheet 4. The device 5 is retracted only when, as shown in FIG. 5c, step a) to e) is repeated in order to produce a thermoplastic sheet having three or more layers. "7" in FIG. 5c indicates the two-layer input sheet as intermediate product; "8" indicates the new thinner input sheet.

It is moreover preferable that step e) in the process of the invention comprises pressing of the assembled thinner thermoplastic sheets that are to undergo thermal welding. The pressing process is generally achieved within seconds to minutes, and/or with a pressure of from 0.01 to 2.0 bar, preferably from 0.1 to 1.0 bar.

In the invention two heating elements are introduced from mutually opposite directions into the intervening space in step b), and/or two heating elements are in turn removed in each case in respectively opposite direction from the intervening space in step d). This is depicted in FIGS. 2 to 5, where the two heating elements 1 and 2 are preferably introduced as sheets, in each case in mutually opposite direction into the intervening space, and this direction of motion is also retained during the removal process; this method is particularly preferred for the purposes of the process of the invention.

In the invention it is preferable that two heating elements are introduced from in each case mutually opposite directions into the intervening space in step b), and that two heating elements are in turn removed in each case in respectively opposite direction from the intervening space in step d).

In the invention it is preferable that the heating elements in steps b) and/or d) are moved with a velocity of from 0.1 to 5 m/s, preferably from 0.3 to 3 m/s.

In another preferred embodiment of the present invention, the heating elements are moved parallel to the xy-plane and along the y-direction (width) of the two thinner thermoplastic sheets. It is moreover preferable that the conversion time in the process of the invention is kept short. The expression "conversion time" means the total duration of steps b) to e).

This means that the total duration of the steps b) to e) is at most 20 seconds, preferably at most 10 seconds, in particular at most 5 seconds.

It is moreover preferable that the process of the invention is carried out in a thermally insulated enclosure and that in the thermal enclosure a temperature is maintained that is constant to the extent of +/−10° C. in the range from 40 to 200° C., preferably from 50 to 100° C.

It is preferable that the first thinner thermoplastic sheet is a foam sheet, where the surface to be welded is free from foam skin. It is moreover preferable that the second thinner thermoplastic sheet is a foam sheet, where the surface to be welded is free from foam skin.

It is preferable in the thermal welding process that in relation to each pair of sheets to be welded at least one, preferably both, surfaces to undergo thermal welding of the thinner thermoplastic sheets (input sheets) are free from foam skin. For the purposes of the present invention, the expression "free from foam skin" means that the foam skin arising during the processes of production of the respective thinner thermoplastic sheet is by way of example removed by planing or milling. For the sake of completeness, it should be noted that when an extruded foam is used the expression "free from extrusion skin" is also used instead of "free from foam skin".

It is moreover preferable in the invention that during the thermal welding process the surface of the first thinner thermoplastic sheet is heated to temperatures of from 50 to 300° C. above the glass transition temperature in the case of amorphous thermoplastic foams or from 50 to 100° C. above the melting point in the case of semicrystalline thermoplastic foams. It is moreover preferable that during the thermal welding process the surface of the second thinner thermoplastic sheet is heated to temperatures of from 50 to 300° C. above the glass transition temperature in the case of amorphous thermoplastic foams or from 50 to 100° C. above the melting point in the case of semicrystalline thermoplastic polymers. The thermoplastic sheets produced by the process of the invention can comprise additional substances/compounds with specific usage properties, for example flame retardants or absorbers of electromagnetic radiation. The invention applies these additional substances, before the thermal welding process, to at least one surface of the input sheets that are to undergo thermal welding. It is preferable that in relation to each pair of sheets to be welded said substances are applied to both surfaces of the input sheets.

In an embodiment of the present invention, the first thinner thermoplastic sheet comprises at least one flame retardant. Flame retardants per se are known to the person skilled in the art. It is preferable that the flame retardant is selected from a phosphate, a phosphite, a phosphonate, a polyphosphonate, melamine, an aluminum oxide hydrate, and a halogenated organic compound.

The second thinner thermoplastic sheet can likewise comprise at least one flame retardant, the flame retardant preferably being selected from a phosphate, a phosphite, a phosphonate, a polyphosphonate, melamine, an aluminum oxide hydrate, and a halogenated organic compound.

The abovementioned flame retardants, preferably the phosphorus-containing flame retardants, but not the halogenated organic compounds, are preferably applied, before the thermal welding process, directly to at least one surface (in relation to each pair of sheets) of the input sheets to be welded.

Preferred phosphates and phosphonates are selected from DMMP (dimethyl methylphosphonate), DMPP (dimethyl propylphosphonate), TCEP (tris(chloroethyl) phosphonate), TCPP (tris(chloropropyl) phosphate), TDCPP (tris(dichloroisoproyl) phosphate), TPP (triphenyl phosphate), TEHP (tris(2-ethylhexyl) phosphate), TKP (tricresyl phosphate), and TCEP (trichloropropyl phosphate).

Preferred halogenated organic compounds are bromine-containing organic compounds, preference being given to HBCD (hexabromocyclododecane) or brominated polystyrenes. Brominated polystyrenes are obtainable commercially, for example from Emerald, Great Lakes. Quantities preferably used of these are from 0.5 to 5% by weight (based on the input sheet). To the extent that halogenated organic compounds are used as flame retardants, they are preferably used before the process of production of the input sheets concludes, i.e. distribution of flame retardant is uniform through the entire thickness of the respective input sheet.

A particularly preferred flame retardant is dimethyl propylphosphonate (DMPP), which is obtained by way of example as Levagard DMPP from Lanxess. In an embodiment of the present invention preference is given to expandable graphite, which can likewise be used as absorber.

To the extent that a flame retardant is used in the invention, it is preferable that the thermal welding process is carried out in the presence of at least one flame retardant.

It is additionally possible that, in relation to each pair of sheets to be welded, that quantities of more than 5 g/m$^2$ of the flame retardant are applied to at least one, preferably to both, surfaces that are to undergo thermal welding of the thinner thermoplastic sheets. It is preferable that quantities of more than 10 g/m$^2$ of the flame retardant, in particular of more than 15 g/m$^2$, are applied to both surfaces that are to undergo thermal welding.

In a possible embodiment of the present invention, the thermal welding is carried out in the presence of at least two flame retardants, and from 0.5 to 5% by weight of at least one halogenated organic compound is introduced into the input sheets during production thereof. Before the thermal welding process, at least one other flame retardant, preferably a phosphorus-containing flame retardant, is applied, in relation to each pair of sheets, to at least one surface to be thermally welded of the input sheets, preferred quantities applied being more than 10 g/m$^2$. After the welding procedure, therefore, the arrangement of the other flame retardant is mostly (i.e. to an extent of more than 90%) in the vicinity of the weld of the thermoplastic sheet.

In another embodiment of the present invention, the process of the invention for the production of at least two-layer thermoplastic sheets via thermal welding uses at least one first thinner thermoplastic sheet with a glass transition temperature ($T_{G1}$) and one second thinner thermoplastic sheet with a glass transition temperature ($T_{G2}$). The glass transition temperature ($T_{G1}$) of the first thinner thermoplastic sheet is lower than the glass transition temperature ($T_{G2}$) of the second thinner thermoplastic sheet. In this embodiment of the process of the invention, the density of the two thinner thermoplastic sheets is of little significance. The descriptions and preferences above apply correspondingly to the steps a) to e).

In another embodiment of the present invention, an at least two-layer sheet is produced. A first thinner thermoplastic sheet is welded here to a thermoset sheet. In this embodiment, the surface of the thermoset sheet is roughened, for example by planing or machining. As in the process of the invention, at least two heating elements are introduced between the thinner thermoplastic foam sheet and the thinner thermoset sheet, and the surface of the thinner thermoplastic sheet is melted. The thinner thermoplastic sheet is then pressed against the thermoset sheet (which has not undergone any melting).

The following invention is explained in more detail with reference to examples below.

EXAMPLES

Thinner Thermoplastic Sheets

The following thinner thermoplastic sheets were used:
Styropor density 15 g/l: foamed sheets made of Styropor® F15E (BASF SE)
Styrodur density 32 g/l: Styrodur® 3035 CS (BASF SE)
Styrodur density 46 g/l: Styrodur® 5000 CS (BASF SE)
Neopor density 15 g/l: foamed sheets made of Neopor® 2200 (BASF SE)
PS/PPE density 48 g/l: sheet foamed in pilot plant (XPS process), made of Noryl® FN215X (Sabic)
PET foam density 80 g/l: AC 80 (Armacell)
PET foam density 100 g/l: AC 100 (Armacell)
PES foam density 50 g/l: Dinvinylcell F50 (Diab)
SAN foam density 33 g/l: sheet foamed in pilot plant (XPS process), made of Luran 368R (Styrolution)
PMMA: sheets made of Plexiglas® WH46SC (Evonik)
ABS/ASA: sheets made of Formaterm (Röchling)

Production of Two-Layer Thermoplastic Sheets

The first thinner thermoplastic sheet and the second thinner thermoplastic sheet were oriented parallel to one another at a distance (a) from one another (see Table 1), so that they formed an intervening space.

Table 1 states the density (D1) and (D2) of the first thinner thermoplastic sheet and of the second thinner thermoplastic sheet, together with the other production parameters, and also the properties of the two-layer thermoplastic sheets produced in the invention.

A first and a second heating element were introduced along offset mutually parallel planes into the intervening space in a manner that was parallel to the two thinner thermoplastic sheets. The distance (a1) between the first thinner thermoplastic sheet and the first heating element is stated in Table 1, as also is the distance (a2) between the second thinner thermoplastic sheet and the second heating element. The temperature of the first heating element was the same as that of the second heating element (T in Table 1). The two heating elements were allowed to remain between the two thinner thermoplastic sheets for a time (t).

The heating elements were then removed from the intervening space between the two thinner thermoplastic sheets, and one sheet was pressed against the surface of the respective other thinner thermoplastic sheet.

The resultant two-layer thermoplastic sheet had the tensile strength stated in Table 1. Tensile strength was determined in accordance with DIN EN ISO 1798:2008.

What is claimed is:

1. A process for the production of at least two-layer thermoplastic sheets via thermal welding of at least one first thinner thermoplastic sheet with density (D1) and of at least one second thinner thermoplastic sheet with density (D2), where the density (D1) of the first thinner thermoplastic sheet is smaller than the density (D2) of the second thinner thermoplastic sheet, comprising the following steps a) to e):
   a) orienting the first thinner thermoplastic sheet and the second thinner thermoplastic sheet parallel to one another at a distance (a) from one another, thus forming an intervening space,
   b) introducing at least one first heating element and at least one second heating element along mutually parallel offset planes into the intervening space in a manner that is parallel to the two thinner thermoplastic sheets, where the surfaces of the thinner thermoplastic sheets and the surfaces of the heating elements do not touch one another and with a distance (a1) between the first heating element and the first thinner thermoplastic sheet and a distance (a2) between the second heating element and the second thinner thermoplastic sheet,
   c) introducing the heating elements between the two thinner thermoplastic sheets to an extent such that, in relation to every location on the surface of the first thinner thermoplastic sheet, the first heating element has been present at least temporarily between the two thinner thermoplastic sheets, and to such an extent that, in relation to every location on the surface of the second thinner thermoplastic sheet, the second heating element has been present at least temporarily between the two thinner thermoplastic sheets, where the first heating element transfers a quantity of energy (E1) to the surface of the first thinner thermoplastic sheet and the second heating element transfers a quantity of energy (E2) to the surface of the second thinner thermoplastic sheet, where the quantity of energy (E1) that the first heating element transfers to the surface of the first thinner thermoplastic sheet is smaller than the quantity of energy (E2) that the second heating element transfers to the surface of the second thinner thermoplastic sheet,
   d) removing the heating elements entirely from the intervening space,
   e) pressing at least one of the two thinner thermoplastic sheets against the surface of the respective other thinner thermoplastic sheet.

2. The process according to claim 1, wherein
   i) the quantity of energy (E1) that the first heating element transfers to the first thinner thermoplastic sheet is adjusted via the distance (a1) between the first heating element and the first thinner thermoplastic sheet, or

TABLE 1

| Example | First sheet | Second sheet | D1 [g/l] | D2 [g/l] | T [° C.] | t [sec] | a1 [mm] | a2 [mm] | a [mm] | Tensile strength [N/mm$^2$] |
|---|---|---|---|---|---|---|---|---|---|---|
| 1 | Styropor | Styrodur | 15 | 32 | 350 | 1.6 | 2.0 | 0.7 | 32.7 | 0.23 |
| 2 | Styrodur | Styrodur | 32 | 46 | 350 | 1.6 | 0.7 | 0.3 | 31.0 | 0.53 |
| 3 | Neopor | Styrodur | 15 | 32 | 350 | 1.6 | 2.4 | 0.7 | 33.1 | 0.21 |
| 4 | E-Por | Styrodur | 25 | 32 | 350 | 1.6 | 1.4 | 0.7 | 32.1 | 0.28 |
| 5 | Styrodur | PS/PPE | 32 | 48 | 370 | 3.0 | 1.4 | 0.7 | 32.1 | 0.40 |
| 6 | PET | PET | 80 | 100 | 360 | 2.5 | 1.3 | 0.8 | 32.1 | 0.45 |
| 7 | PES | PMMA | 45 | 1180 | 390 | 3.0 | 5.05 | 0.5 | 35.5 | 0.28 |
| 8 | SAN | ASA | 33 | 1030 | 360 | 1.8 | 4.0 | 0.7 | 34.7 | 0.39 | ii) the quantity of energy (E2) that the second heating element transfers to the second thinner thermoplastic sheet is adjusted via the distance (a2) between the second heating element and the second thinner thermoplastic sheet.

3. The process according to claim 1, wherein
i) the quantity of energy (E1) that the first heating element transfers to the first thinner thermoplastic sheet is adjusted via the temperature (T1) of the first heating element, or
ii) the quantity of energy (E2) that the second heating element transfers to the second thinner thermoplastic sheet is adjusted via the temperature (T2) of the second heating element.

4. The process according to claim 1, wherein
i) the density (D1) of the first thinner thermoplastic sheet is in the range from 10 to 70 g/i, or
ii) the density (D2) of the second thinner thermoplastic sheet is in the range from 25 to 100 g/l, or
iii) the density (D1) is smaller by at least 1 g/l than the density (D2).

5. The process according to claim 4, wherein the density (D2) of the second thinner thermoplastic sheet is in the range from 30 to 100 g/l.

6. The process according to claim 4, wherein the density (D2) of the second thinner thermoplastic sheet is in the range from 30 to 75 g/l.

7. The process according to claim 1, wherein when the heating elements have been introduced into the intervening space they are kept there for a time in the range from 0.2 to 10 seconds.

8. The process according to claim 1, wherein
i) the first thinner thermoplastic sheet is a foam sheet based on a polymer selected from the group consisting of polystyrene, polystyrene copolymers, polyether sulfone, polysulfone, polyethylene terephthalate, polyurethane, polyolefins, polyolefin copolymers and acrylic polymers, or
ii) the second thinner thermoplastic sheet is a thermoplastic polymer selected from the group consisting of polystyrene, polystyrene copolymers, polyether sulfone, polysulfone, polyethylene terephthalate, polyurethane, polyolefins, polyolefin copolymers and acrylic polymers.

9. The process according to claim 1, wherein the thickness of the weld formed by the thermal welding process is from 30 to 500 µm.

10. The process according to claim 1, wherein
i) the first thinner thermoplastic sheet is a foam sheet, where the surface to be welded is free from the foam skin, or
ii) the second thinner thermoplastic sheet is a foam sheet, where the surface to be welded is free from foam skin.

11. The process according to claim 1, wherein in step b) two heating elements are introduced from respectively mutually opposite directions into the intervening space or in step d) two heating elements are in turn removed in respectively mutually opposite directions from the intervening space.

12. The process according to claim 1, wherein
i) the distance (a1) between the first heating element and the first thinner thermoplastic sheet is in the range from 0.5 to 10 mm, or
ii) the distance (a2) between the second heating element and the second thinner thermoplastic sheet is in the range from 0.2 to 7.5 mm.

13. The process according to claim 1, wherein
i) precisely two heating elements are used or the heating elements are heating plates, preferably heating plates with a surface temperature in the range from 200 to 700° C., heated indirectly by means of IR sources, or
ii) the heating elements in steps b) or d) are moved with a velocity of from 0.1 to 5 m/s.

14. The process according to claim 1, wherein
i) the first thinner thermoplastic sheet comprises at least one flame retardant, or
ii) the second thinner thermoplastic sheet comprises at least one flame retardant, or
iii) during the thermal welding process the surface of the first thinner thermoplastic sheet is heated to temperatures of from 50 to 300° C. above the glass transition temperature in the case of amorphous thermoplastic foams or from 50 to 100° C. above the melting point in the case of semicrystalline thermoplastic foams, or
iv) during the thermal welding process the surface of the second thinner thermoplastic sheet is heated to temperatures of from 50 to 300° C. above the glass transition temperature in the case of amorphous thermoplastic foams or from 50 to 100° C. above the melting point in the case of semicrystalline thermoplastic polymers.

15. The process according to claim 1, wherein
i) the total duration of the steps b) to e) is at most 20 seconds, or
ii) the process is carried out in a thermally insulated enclosure and in the thermal enclosure a temperature is maintained that is constant to the extent of +/−10° C. in the range from 40 to 200° C.

16. The process according to claim 1, wherein
i) the length (x-direction) of the first thinner thermoplastic sheet in step a) is from 500 to 2800 mm, its width (y-direction) being from 500 to 1250 mm, and its thickness (z-direction) being from 20 to 200 mm, or
ii) the length (x-direction) of the second thinner thermoplastic sheet in step a) is from 500 to 2800 mm, its width (y-direction) being from 500 to 1250 mm, and its thickness (z-direction) being from 20 to 200 mm, or
iii) the length (x-direction) of the first heating element is the same as or at most 10% greater than the length (x-direction) of the first thinner thermoplastic sheet, and the width (y-direction) of the first heating element is from 30 to 120% of the width (y-direction) of the first thinner thermoplastic sheet, or
iv) the length (x-direction) of the second heating element is the same as or at most 10% greater than the length (x-direction) of the second thinner thermoplastic sheet, and the width (y-direction) of the second heating element is from 30 to 120% of the width (y-direction) of the second thinner thermoplastic sheet, or
v) the heating elements are moved in a manner that is parallel to the xy-plane and along the y-direction (width) of the two thinner thermoplastic sheets.

* * * * *